July 8, 1958  E. U. LANG  2,842,355
SAFETY SPRING CARTRIDGE

Filed April 8, 1954  2 Sheets-Sheet 1

INVENTOR.
ERNEST U. LANG,
BY:
Harold B. Hood
ATTORNEY.

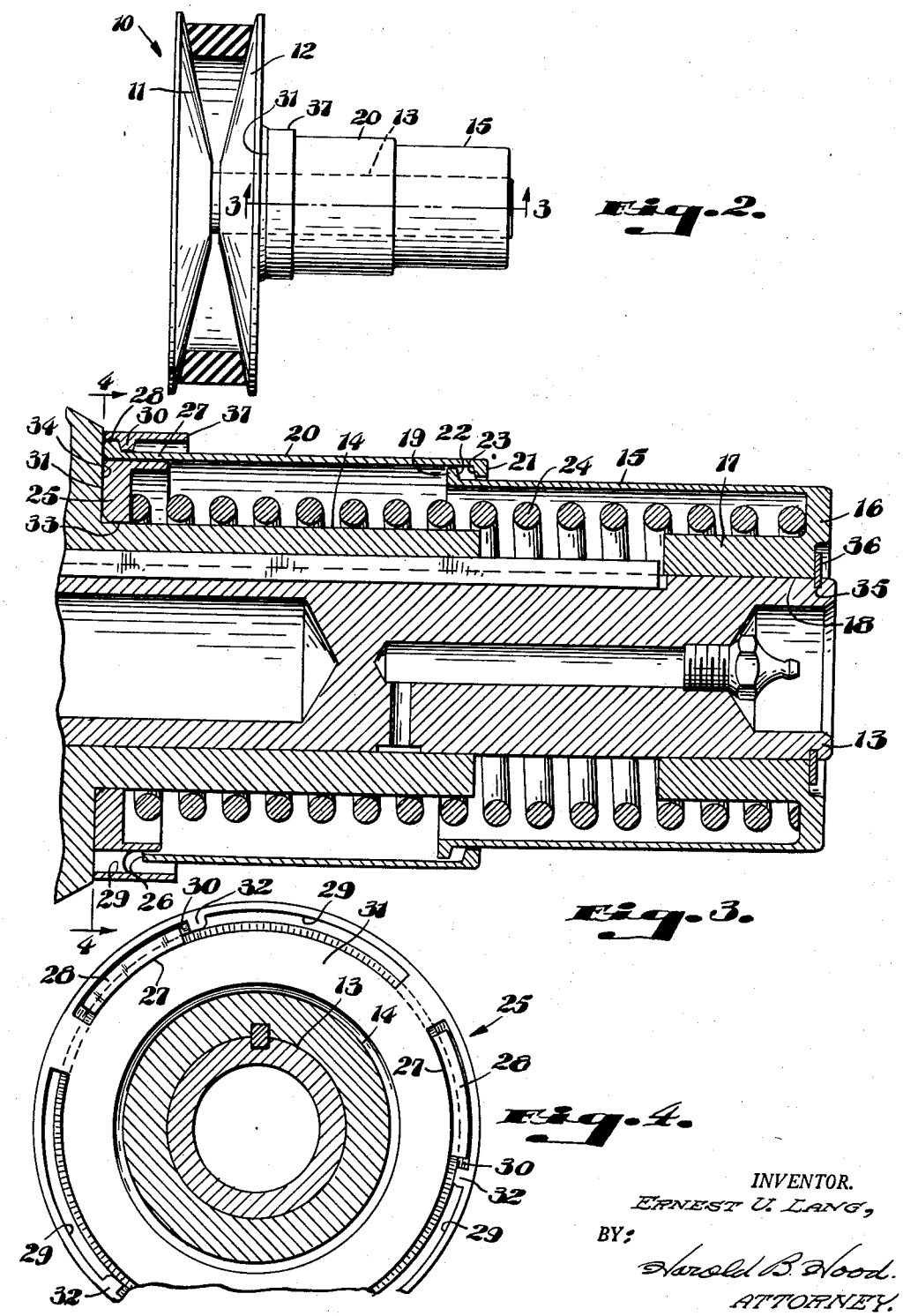

United States Patent Office 2,842,355
Patented July 8, 1958

2,842,355

SAFETY SPRING CARTRIDGE

Ernest U. Lang, Columbus, Ind., assignor, by mesne assignments, to The Reliance Electric and Engineering Company, Cleveland, Ohio, a corporation of Ohio Application April 8, 1954, Serial No. 421,907

7 Claims. (Cl. 267—1)

The present invention relates to a spring cartridge intended for use primarily in a resiliently-expansible V-pulley structure. Such a structure conventionally comprises a pair of mating coned discs, one of said discs having a spindle projecting axially therefrom in the direction of the other disc; such other disc having a hub sleeved on said spindle for movement of said discs toward and away from each other. A coiled spring surrounds the spindle and hub and is confined between opposed shoulders thereon to urge said other disc yieldingly toward said one disc.

Such coiled springs are subject to fatigue and breakage necessitating their replacement from time to time. While the initial assembly of such a structure by the manufacturer presents little difficulty, the replacement of the spring by a user is relatively difficult. Such springs must be compressed and held so while being fixed in the structure and, without proper tools, this is a tedious and sometimes hazardous task.

It is the primary object of this invention, therefore, to provide a cartridge for such a spring which can be completely assembled and "pre-compressed" prior to its incorporation in such a V-pulley structure. Replacement of a defective spring thereby becomes a relatively simple and non-hazardous operation.

Another object is to provide a novel construction for such a cartridge which will receive and hold the spring safely under compression and in proper alignment for future assembly in a V-pulley structure.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a side elevation of a V-pulley structure showing my cartridge associated therewith;

Fig. 3 is a partial sectional view taken substantially on line 3—3 of Fig. 2, and drawn to an enlarged scale; and Fig. 4 is a sectional view taken substantially on line 4—4 of Fig. 3 and showing further details of my spring cartridge.

Figure 1:
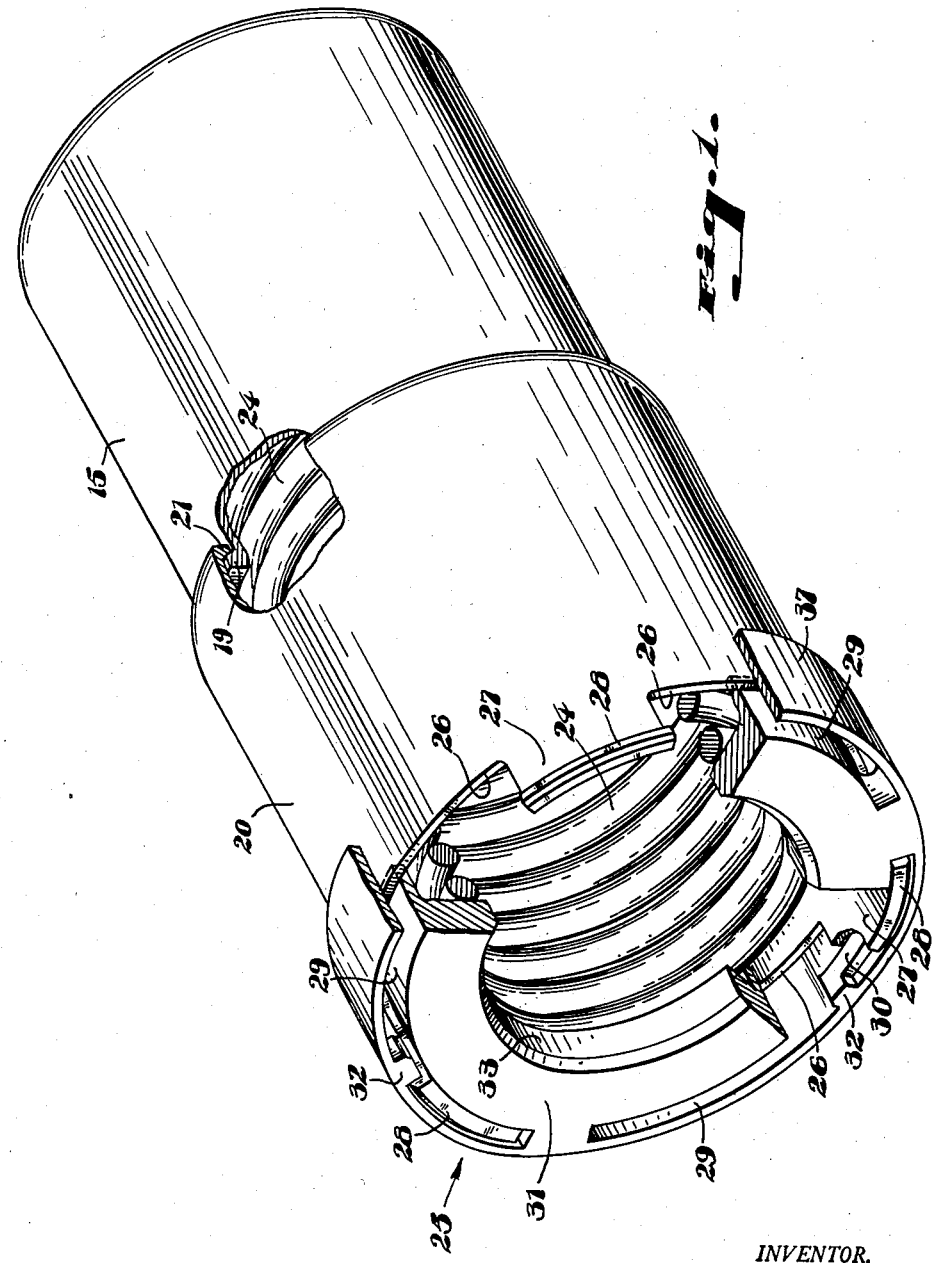
Fig. 1 is a perspective view, partially broken away, showing the spring cartridge constituting my invention.

Referring more particularly to the drawings, and especially to Figs. 2 and 3, I have illustrated a more or less conventional type, resiliently-expansible V-pulley 10 comprising a pair of mating coned discs 11 and 12. Disc 11 is provided with a spindle 13 projecting axially therefrom in the direction of disc 12, and disc 12 has a hub 14 projecting away from disc 11 and adapted to be sleeved upon spindle 13 for movement of disc 12 toward and away from disc 11. In such a structure, a shoulder is conventionally provided near the outboard end of spindle 13 and an opposing shoulder is provided on disc 12; a coiled spring being confined between said shoulders to urge disc 12 yieldingly toward disc 11. My invention involves the concept of providing a pre-compressed spring unit for use in such a structure.

I have embodied by invention in the spring cartridge unit shown in Fig. 1 and illustrated in longitudinal section in Fig. 3. Such unit comprises a first tubular member 15 having an end wall 16 preferably formed with a hub 17 having a central bore 18 therethrough substantially coaxial with member 15. A radially outwardly projecting peripheral flange 19 is formed at the opposite end of tubular member 15.

A second tubular member 20 has a radially inwardly projecting peripheral flange 21 on one end thereof, and said tubular member is adapted to be telescopically sleeved on tubular member 15 with flange 21 overlapping flange 18 to prevent axial separation of said tubular members in one direction. Each of the flanges 19 and 21 terminates short of the adjacent peripheral surface of the tubular member supporting the other flange. The mating surfaces 22 and 23, of the flanges 19 and 21 respectively, are formed substantially conical in cross section. Thereby, the tubular members 15 and 20 are urged toward substantial axial alignment.

After the tubular members 15 and 20 have been so associated, a coiled spring 24 is placed therein with one end against the end wall 16. The open end of tubular member 20 is adapted to be closed by a cover member 25 to confine spring 24 under compression between end wall 16 and said cover member.

The end of tubular member 20 opposite flange 21 is notched, as at 26, to define a plurality of fingers 27. Each such finger is provided with a radially outwardly projecting toe or lip 28.

Cover member 25 is formed with a plurality of peripherally extending slots 29 therethrough for registry with fingers 27. Each of said slots has formed in a common end thereof a radially inwardly projecting ledge 30 spaced slightly from the outer end 31 of cover member 25. Thus, a bayonet-slot locking means for securing said cover member or cap 25 to the member 20 is provided. An abutment 32 is provided on the inner end of each of such ledges.

After the spring 24 has been placed in the tubular members 15 and 20, cover member 25 is placed against the outer end of said spring and is moved toward the adjacent end of tubular member 20. The fingers 27 are entered in the slots 29, at the end opposite the ledges 30, and the cover member is sleeved onto tubular member 20. The notches 26 are made deep enough to permit the cover member 25 to be moved onto tubular member 20 far enough to permit the lips 28 to move beyond the outer end 31 of said cover member. Tubular member 20 is then rotated, relative to cover member 25, to move the lips 28 past the abutments 32. Pressure against cover member 25 is then relaxed to permit said member to be moved in the opposite direction, by spring 24, to seat lips 28 upon the ledges 30.

Cover member 25 is provided with a central bore 33 therethrough substantially coaxial with the tubular member 20. A shoulder 34 is formed on hub 14 adjacent disc 12. In assembling the cartridge unit with the V-pulley, the unit is slipped over the outboard end of spindle 13 and the hub 14 is passed through bore 33 in cover member 25 to seat the outer end 31 of said cover member against the shoulder 34. The distance between the end 31 and the remote end of wall 16 is made slightly less than the distance between shoulder 34 and the outboard end of spindle 13, when disc 12 is moved to its position nearest disc 11.

An annular groove 35 is provided near the outboard end of spindle 13 and, after the cartridge unit has been so placed upon the hub and spindle of the V-pulley 10, a snap ring 36 is fitted in groove 35 to provide a retaining shoulder against which the end wall 16 will engage. Movement of disc 12 away from disc 11 will then compress spring 24 in the manner of heretofore conventional structures. To prevent dirt and the like from entering into the cartridge unit by way of the notches 26, I provide a peripheral skirt 37 on cover member 25 adapted to overlie the fingers 27 and to close the notches 26 defining said fingers.

It will readily be recognized that the task of replacing a defective spring, in a V-pulley structure of the type here under consideration, is greatly simplified by the use of my spring cartridge unit. When a spring needs replacing, it is necessary merely to remove the snap ring 36, slip off the defective cartridge unit, replace it with a new cartridge unit, and replace the snap ring 36. The problem of holding the spring 24 under compression while fitting it in the V-pulley structure is entirely eliminated. The hazard of having such a spring slip out from under such compression and injure a mechanic, during the spring-changing operation, is also entirely eliminated.

I claim as my invention:

1. A spring cartridge comprising a first tubular member, a second tubular member telescopically associated with said first tubular member and freely rotatable relative thereto about the common axis of said tubular members, cooperating lip means near one end of each of said tubular members for preventing axial separation of said tubular members in one direction, means providing a wall adjacent the other end of said first tubular member, a cap member, bayonet-slot locking means on said cap member and the other end of said second tubular member, and a coiled compression spring received in said tubular members and confined between said wall and said cap member, said wall and said cap member each being formed with a substantially central bore therethrough substantially coaxial with said tubular members for mounting said cartridge on a shaft means.

2. A spring cartridge comprising a first tubular member, a second tubular member telescopically associated with said first tubular member, cooperating lip means near one end of each of said tubular members for preventing axial separation of said tubular members in one direction, means providing a wall adjacent the other end of said first tubular member, a cap member, a coiled compression spring received in said tubular members and confined between said wall and said cap member, said wall and said cap member each being formed with a substantially central bore therethrough substantially coaxial with said tubular members, said second tubular member being notched through the other end thereof to define a plurality of fingers each having a radially projecting toe on the distal end thereof, and said cap member having a plurality of circumferentially extending slots therethrough registrable with said fingers and of a width at one end sufficient to pass said toes but insufficient at the opposite end to pass said toes, said toes being entered through said slots at said one ends thereof and moved to the opposite ends, upon relative rotation between said cap member and said tubular member, to constitute bayonet-slot locking means for releasably retaining said cap member on said tubular member.

3. A spring cartridge comprising a first tubular member, a second tubular member telescopically associated with said first tubular member, cooperating lip means near one end of each of said tubular members for preventing axial separation of said tubular members in one direction, means providing a wall adjacent the other end of said first tubular member, a cap member, a coiled compression spring received in said tubular members and confined between said wall and said cap member, said wall and said cap member each being formed with a substantially central bore therethrough substantially coaxial with said tubular members, said second tubular member being notched through the other end thereof to define a plurality of fingers each having a radially outwardly projecting toe on the distal end thereof, and cap member having a plurality of circumferentially extending slots formed therethrough registrable with said fingers and a radially inwardly projecting ledge, at one end of each of said slots and spaced slightly from the outer end of said cap member, said fingers being entered through said slots and said cap member being rotated relative to said tubular member to seat said toes upon the respective ledges to constitute bayonet-slot locking means for releasably retaining said cap member on said tubular member.

4. The device of claim 3 including an abutment near the inner end of each of said ledges over which said toes must be moved in order to be so seated upon said ledges.

5. The device of claim 4 in which said cap member is formed with a peripheral skirt adapted to overlie said fingers on said second tubular member to guard the notches defining said fingers.

6. A spring cartridge comprising a first tubular member having a wall adjacent one end thereof and a radially projecting peripheral flange on the other end thereof, a second tubular member telescopically associated with said first tubular member and having a radially oppositely projecting peripheral flange on one end thereof cooperating with the flange on said first tubular member to prevent axial separation of said members in one direction, said second tubular member being notched through the other end thereof to define a plurality of fingers each having a radially projecting lip at the distal end thereof, a cover for said other end of said second tubular member having a plurality of circumferentially extending slots formed therethough registrable with said fingers, a radially projecting ledge at one end of each of said slots axially spaced slightly from the outer end of said cover with an abutment at the end of each such ledge adjacent the corresponding slot, and a coiled compression spring within said tubular members, said fingers being passed through said slots and said cover rotated, relative to said second tubular member, to move said lips onto said ledges behind said abutments to confine said spring between said cover and the wall of said first tubular member, said well and said cover each having a substantially central bore therethrough substantially coaxial with said tubular members.

7. The device of claim 6 in which said cover includes a peripheral skirt adapted, when said cover is associated with said second tubular member, to overlie said fingers and to guard the notches defining said fingers.

References Cited in the file of this patent

UNITED STATES PATENTS

| 1,737,328 | Parisi | Nov. 26, 1929 |
| 1,958,894 | Knape | May 15, 1934 |
| 2,287,326 | Reeves et al. | June 23, 1942 |
| 2,402,400 | Hewitt et al. | June 18, 1946 |
| 2,417,154 | Dath | Mar. 11, 1947 |

FOREIGN PATENTS

| 580,094 | Great Britain | Aug. 27, 1946 |

OTHER REFERENCES

"How To Design Parts That Assemble and Lock by Twisting," Product Engineering of August 1952, pages 162 and 163.